(12) United States Patent
de Rooij et al.

(10) Patent No.: US 10,840,742 B2
(45) Date of Patent: Nov. 17, 2020

(54) WIRELESS POWER RECEIVER SYNCHRONIZATION DETECTION CIRCUIT

(71) Applicant: Efficient Power Conversion Corporation, El Segundo, CA (US)

(72) Inventors: Michael A. de Rooij, Playa Vista, CA (US); Yuanzhe Zhang, Torrance, CA (US)

(73) Assignee: Efficient Power Conversion Corporation, El Segundo, CA (US)

( * ) Notice: Subject to any disclaimer, the term of this patent is extended or adjusted under 35 U.S.C. 154(b) by 0 days.

(21) Appl. No.: 16/443,411

(22) Filed: Jun. 17, 2019

(65) Prior Publication Data

US 2019/0386518 A1  Dec. 19, 2019

Related U.S. Application Data

(60) Provisional application No. 62/686,307, filed on Jun. 18, 2018.

(51) Int. Cl.
*H02J 50/12* (2016.01)
*H02M 7/219* (2006.01)
*H02M 1/08* (2006.01)
*H02J 7/02* (2016.01)
*H02M 1/00* (2006.01)

(52) U.S. Cl.
CPC ............. *H02J 50/12* (2016.02); *H02M 1/083* (2013.01); *H02M 7/219* (2013.01); *H02J 7/025* (2013.01); *H02M 2001/0009* (2013.01)

(58) Field of Classification Search
CPC ............ H02J 7/025; H02J 50/10; H02J 50/12; H02M 1/083; H02M 2001/0009; H02M 7/219

USPC ........................................................ 307/104
See application file for complete search history.

(56) References Cited

U.S. PATENT DOCUMENTS

| 2012/0242311 A1* | 9/2012 | Terry | H02J 50/12 323/282 |
| 2015/0001956 A1* | 1/2015 | Saen | H04B 5/0037 307/104 |
| 2015/0102685 A1* | 4/2015 | Blood | B60L 53/126 307/104 |
| 2016/0043562 A1* | 2/2016 | Lisi | H02J 7/0047 307/104 |

(Continued)

OTHER PUBLICATIONS

C.H.K Jensen et al., "Resonant Full-Bridge Synchronous Rectifier Utilizing 15 V GaN Transistors for Wireless Power Transfer Applications Following AirFuel Standard Operating at 6.78 MHz", Proceedings of 2018 IEEE Applied Power Electronics Conference and Exposition (2018).

*Primary Examiner* — William Hernandez
(74) *Attorney, Agent, or Firm* — Blank Rome LLP

(57) ABSTRACT

A wireless power receiver circuit includes an active rectifier circuit with a plurality of power transistors, wherein the active rectifier circuit is configured to rectify an induced AC receiver current. The wireless power receiver circuit includes also includes a gate drive controller circuit configured to sense the induced AC receiver current and to provide gate drive signals for the plurality of power transistors synchronized with the induced AC receiver current. The gate drive controller circuit includes a current sense circuit configured to provide two voltage signals having a difference proportional to the induced AC receiver current.

11 Claims, 6 Drawing Sheets

(56) References Cited

U.S. PATENT DOCUMENTS

2017/0302193 A1* 10/2017 Zhang ................... H02M 7/219
2017/0346344 A1* 11/2017 Uchimoto ............... H02J 50/90
2019/0181682 A1*  6/2019 Kim ....................... H02J 50/10

* cited by examiner

US 10,840,742 B2

WIRELESS POWER RECEIVER SYNCHRONIZATION DETECTION CIRCUIT

This application claims the benefit of U.S. Provisional Application No. 62/686,307, filed on Jun. 18, 2018, the entire contents of which are hereby incorporated by reference herein.

BACKGROUND

There is an ongoing trend towards the goals of miniaturization, waterproofing, and power efficiency for many consumer electronic devices (e.g., wearables or smart phones). One way to facilitate these goals is the use of wireless power transfer systems to power these consumer electronic devices. For example, a wireless power transfer system can eliminate an external power port (facilitating waterproofing efforts) and increase layout space for internal components of a consumer electronic device.

A typical wireless power transfer system includes a base station with a transmitter coil. The consumer electronic device to be powered includes a receiver coil. When the transmitter coil and the receiver coil are sufficiently close in proximity, the electromagnetic field generated by the transmitter coil results in current flow in the receiver coil. With appropriate electronics, the consumer electronic device uses the current flow induced in the receiver coil to charge a battery and/or otherwise power the device. Efforts to improve the efficiency of existing wireless power transfer systems are ongoing.

SUMMARY OF THE INVENTION

The present invention provides a wireless power receiver circuit comprising an active rectifier circuit for rectifying an induced AC receiver current. The wireless power receiver circuit includes gate drive controller circuitry for synchronizing the gate drive signals for transistors of the active rectifier circuit with the AC current in the wireless power receiver coil. The gate drive controller circuitry includes current sense circuitry, zero-crossing detection circuitry and magnitude detection circuitry. The gate drive signal is disabled when the sensed current is less than a threshold value.

BRIEF DESCRIPTION OF THE DRAWINGS

For a detailed description of various examples, reference will now be made to the accompanying drawings in which.

DETAILED DESCRIPTION OF THE PREFERRED EMBODIMENTS

The present invention is directed to a wireless power receiver with circuitry for synchronizing the gate drive signals for the transistors of an active rectifier circuit with the AC current in the wireless power receiver coil.

Figure 1:
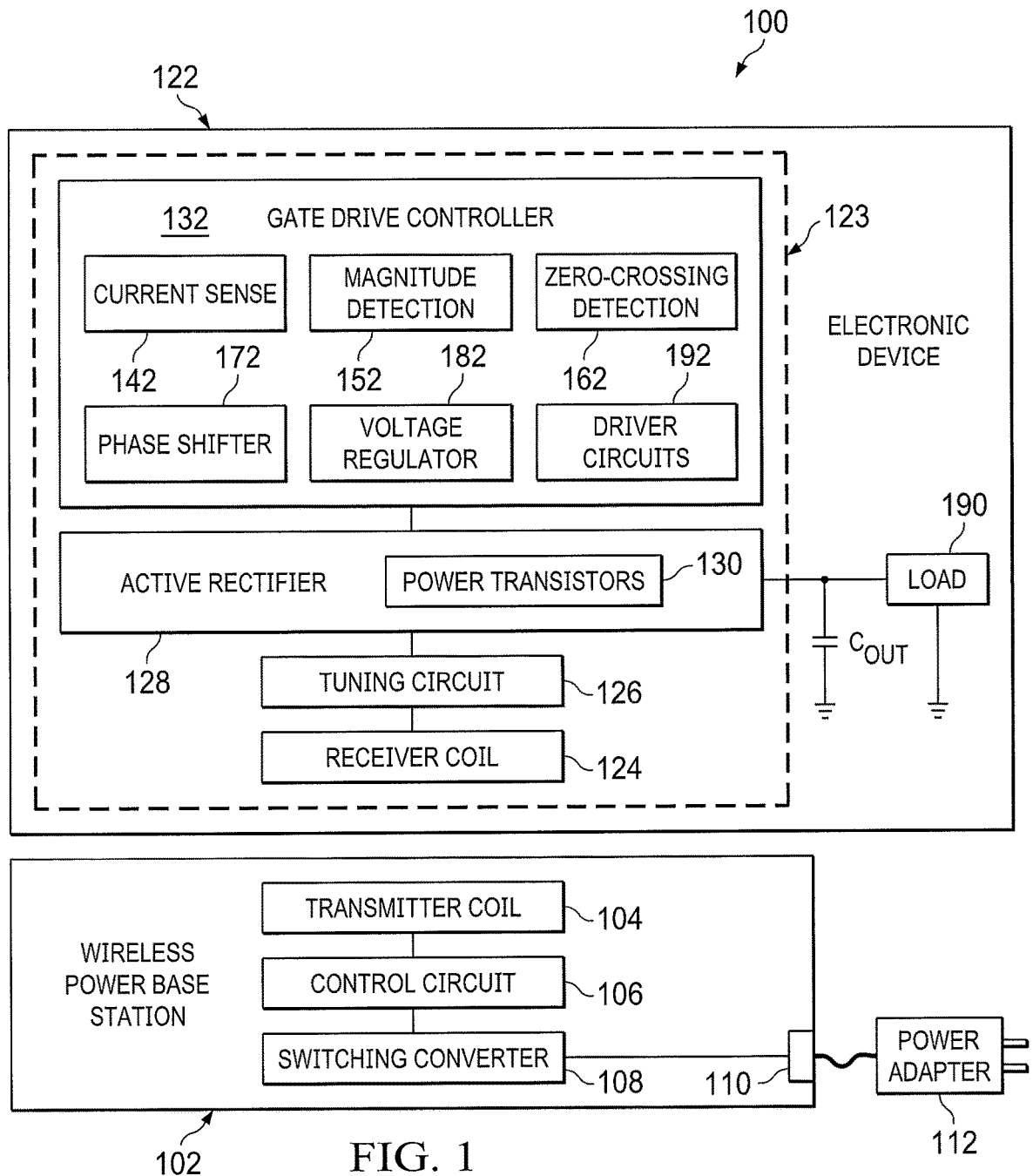
FIG. 1 shows a block diagram of a wireless power system in accordance with the present invention.

FIG. 1 shows a block diagram of a wireless power system 100 in accordance with the present invention. The wireless power system 100 includes a wireless power base station 102 configured to provide a wireless (electromagnetic) signal using a transmitter coil 104 driven by a control circuit 104. The control circuit 106 sets the magnitude and frequency of current flow in the transmitter coil 104 based on a voltage level provided by a switching converter 108. The switching converter 108 is coupled to a power adapter 112 (e.g., via a port 110). The power adapter 112 plugs into an alternating current (AC) outlet (not shown).

The wireless power system 100 also includes an electronic device 122, such as a wearable device, a smart phone, a wireless power hub, or other electronic device. In the case of a wearable device or a smart phone, the load 190 represents the circuitry of the wearable device or smart phone. In the example of a wireless power hub, the load 190 is external to the electronic device 122 and represents another electronic device powered by the wireless power hub. When the electronic device 122 is placed in proximity to the wireless power base station 102, a wireless power receiver 123 of the electronic device 122 provides power to the load 190. More specifically, when the electronic device 122 is placed in proximity to the wireless power base station 102, a current is induced in a receiver coil 124 of the wireless power receiver 123 due to the electromagnetic field generated by the wireless power base station 102 (the electromagnetic field is a function of the current in the transmitter coil 104).

As shown in FIG. 1, the wireless power receiver 123 includes a receiver coil 124 and a tuning circuit 126 coupled to the receiver coil 124. The tuning circuit 126 is a network of capacitors and inductors configured to improve the efficiency of the wireless power system 100. Coupled to the tuning circuit 126 is an active rectifier 128 with power transistors 130. The active rectifier may have a class E topology, a current mode class D topology, a voltage mode class D topology, a push pull topology, a hybrid topology, or a voltage doubler rectifier topology. The DC output of the active rectifier 128 is coupled to an output capacitor ($C_{OUT}$) and to the load 190.

As further shown in FIG. 1, the gate drive signals for the power transistors 130 are provided by a gate drive controller 132. The gate drive controller 132 comprises a current sense circuit 142, a magnitude detection circuit 152, a zero-crossing detection circuit 162, a phase shifter circuit 172, a voltage regulator circuit 182, and driver circuits 192. More specifically, the current sense circuit 142 is configured to generate a pair of voltage signals having difference that represents a scaled version of the induced current in the receiver coil 124. The voltage signals generated by the current sense circuit 142 are fed to a magnitude detection circuit 152, which determines whether the induced current in the receiver coil is greater than a predetermined threshold value. The voltage signals generated by the current sense circuit 142 are also fed to a zero-crossing detection circuit 162 to detect changes of direction in the induced current in the receiver coil 124. The output of the zero-crossing detection circuit 162, which is enabled by a signal from the magnitude detection circuit 152, is provided to a phase shifter circuit 172 configured to calibrate out system delay. The output of the phase shifter circuit 172 is then provided as a control signal to the driver circuits 192, which generate output gate drive signals for the power transistors 130, synchronized with the induced current in the receiver coil.

Figure 2:
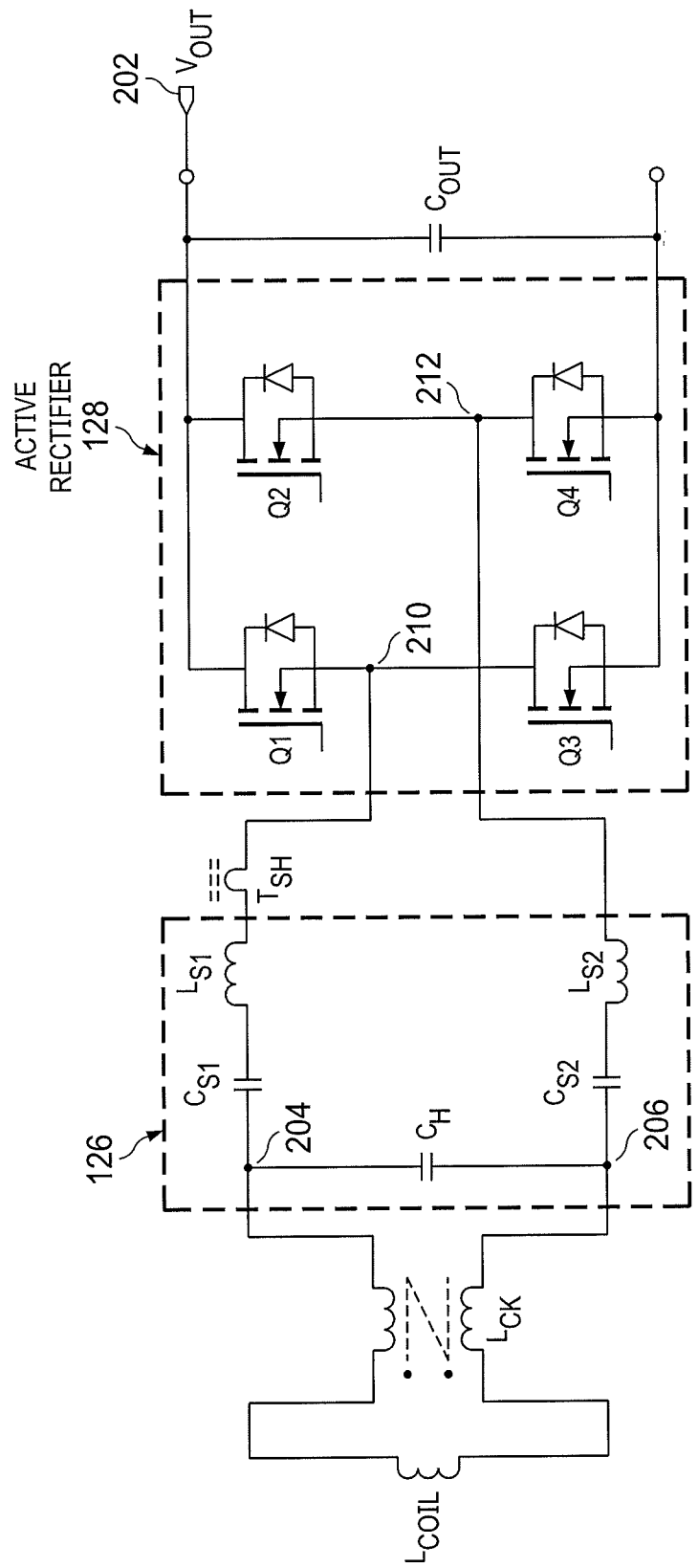
FIG. 2 shows a schematic diagram of the tuning network and active rectifier of the wireless power receiver of the present invention.

FIG. 2 shows a schematic diagram of the receiver coil 124, the tuning circuit 126 and the active rectifier 128 of the wireless power receiver 200 of the present invention. As shown in FIG. 2, the receiver coil 124 ($L_{COIL}$) is coupled to tuning network 126 via a common-mode choke with inductance ($L_{CK}$). The tuning network 126 comprises a capacitor ($C_H$) that extends between a first input node 204 and a second input node 206. The tuning network 126 also includes a pair of capacitors ($C_{S1}$ and $C_{S2}$) connected respectively in series with a pair of inductors ($L_{S1}$ and $L_{S2}$). The current flowing through the primary winding of Tsh is sensed by current sense circuit 142 to enable the gate drive controller 132 to provide gate drive signals to the power transistors of the active rectifier 128 that are synchronized with the induced current in the receiver coil ($L_{COIL}$).

In the example of FIG. 2, the active rectifier 128 includes four power transistors, Q1-Q4, preferably GaN transistors as shown, arranged in a full bridge topology. The induced AC coil current is provided as an input to the active rectifier 128 at nodes 210 and 212, and is rectified by the transistors, which receive gate drive signals from gate drive controller 132.

In operation, the induced current in $L_{COIL}$ (due to proximity to a wireless power base station) results in an alternating current (AC) signal that is fed to the active rectifier 128 (specifically to nodes 210 and 212). The gate drive controller 132 senses the current, particularly the change of direction of the AC current, and controls the gate drive signals provided to Q1-Q4 so that the transistors are switched synchronously with the induced AC current.

At the output node 202, the output voltage ($V_{OUT}$) from the active rectifier 128A is smoothed by capacitor $C_{OUT}$ and can be used to provide power to a load (e.g., the load 190 in FIG. 1).

In various embodiments, the wireless power receiver of the present invention can include discrete components, integrated circuit components, and/or a combination of discrete components and integrated circuit components mounted on a printed circuit board (PCB). For example, the active rectifier circuit and the gate drive controller may be included in a single integrated circuit, which is coupled to a receiver coil and/or a tuning network for the receiver coil. Alternatively, the active rectifier circuit and the gate drive controller may reside on different integrated circuits that are connected together. To provide a better understanding, various circuit details, options, and scenarios are described with reference to the figures as follows.

Figure 3:
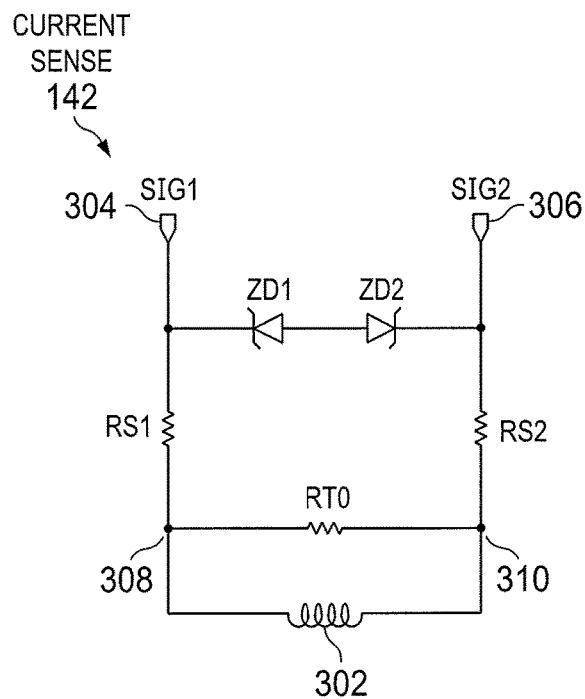
FIG. 3 shows a schematic diagram of the current sense circuit of the present invention.

FIG. 3 shows a schematic diagram of the current sense circuit 142 in accordance with the present invention. As shown, the current sense circuit 142 includes a winding 302, which is the corresponding secondary winding of $T_{SH}$ (FIG. 2), through which the current sense circuit 142 receives a current representative of the induced AC current provided to the active rectifier 128. In some examples, the winding 302 has more turns than the primary winding of $T_{SH}$ (e.g., the second winding of $T_{SH}$ wraps around the first winding of $T_{SH}$) and carries a current that is scaled down relative to the current in the primary winding of $T_{SH}$.

With continuing reference to FIG. 3, a resistor (RT0) is coupled in parallel with the winding 302 between nodes 308 and 310. As shown, a first sense resistor (RS1) is coupled between the node 308 and a first output signal (SIG1) node 304 of the current sense circuit 142, and a second sense resistor (RS2) is coupled between the node 310 and a second output signal (SIG2) node 306 of current sense circuit 142. Zener diodes, ZD1 and ZD2 are arranged between the SIG1 and SIG2 nodes 304 and 306 to clip the voltages when the voltage difference becomes too large. The voltage difference at the SIG1 and SIG2 nodes 304 and 306 is representative of the induced current in the receiver (e.g., the receiver coil 124 in FIG. 1, or $L_{COIL}$ in FIG. 2) of wireless power receiver 123. In operation, the current sense circuit 142 is configured to output a range of voltage values across the SIG1 and SIG2 terminals 304 and 306, where the voltage value is processed by circuitry (as described below) to determine the magnitude, direction, and/or change of direction of current flowing in the receiver coil 124 in FIG. 1, or $L_{COIL}$ in FIG. 2). As described above, ZD1 and ZD2 operate to limit the voltage values across the SIG1 and SIG2 nodes 304 and 306 to a particular range (e.g., +/−5V). The voltage values of SIG1 and SIG2 vary as the current flowing in a wireless power receiver coil (e.g., the receiver coil 124 in FIG. 1, or $L_{coil}$ in FIG. 2) varies.

Figure 4:
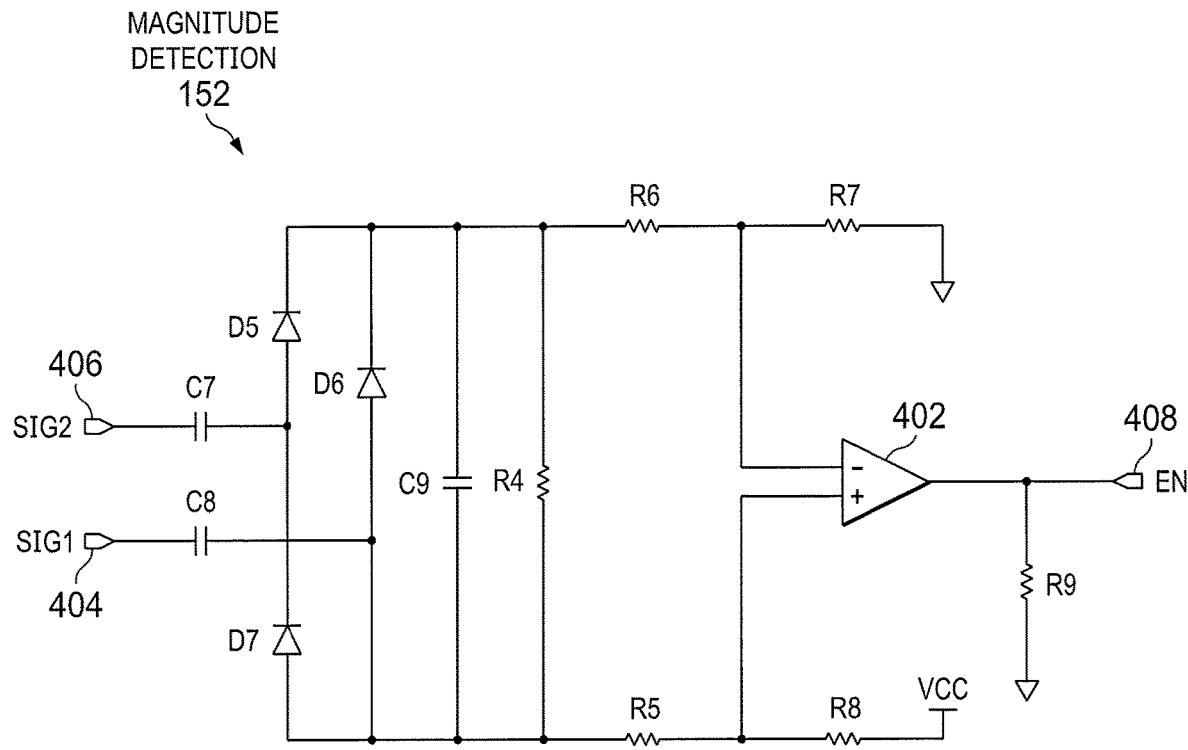
FIG. 4 shows a schematic diagram of the magnitude detection circuit of the present invention.

FIG. 4 shows a schematic diagram of magnitude detection circuit 152. As shown, magnitude detection circuit 152 includes first and second inputs nodes 404 and 406, where the first input node 404 receives SIG1 from the SIG1 node 304 of the current sense circuit 142, and where the second input node 406 receives SIG2 from the SIG2 node 306 of the current sense circuit 142.

As shown, the magnitude detection circuit 152 includes various capacitors (C7-C9), diodes (D5-D7), resistors (R4-R9), and a comparator 402. More specifically, diodes D6, D7 and D8 are arranged to form a low power modified bridge rectifier that generates a DC voltage proportional to the magnitude of the coil current. This voltage is compared to a predetermined threshold set by resistor bias networks (R6, R7 and R5, R8). The output of comparator provides an enable signal EN at 408 if the magnitude of the coil current exceeds a predetermined threshold (Ith). As described below, the enable signal EN determines if the output of the zero-crossing detection circuitry is disabled or not. This prevents unstable output of the gate drive controller caused by low current magnitude in the zero-crossing detection circuitry, and allows reliable operating over a wide range.

Figure 5:
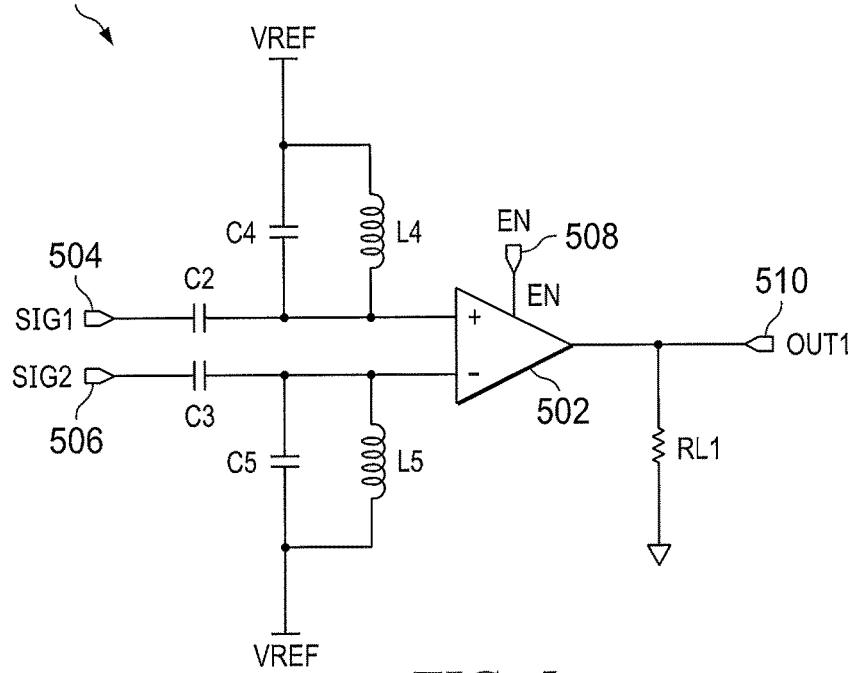
FIG. 5 shows a schematic diagram of the zero-crossing detection circuit of the present invention.

FIG. 5 shows a schematic diagram of zero-crossing detection circuit 162. As shown in FIG. 5, zero-crossing detection circuit 162 includes first and second inputs nodes 504 and 506, where the first input node 504 receives SIG1 from the SIG1 node 304 of the current sense circuit 142, and where the second input node 506 receives SIG2 from the SIG2 node 306 of the current sense circuit 142.

As shown, the zero-crossing detection circuit 162 include a high-speed comparator 502 and two input bias networks (C2, C4, L4 and C3, C5, L5) tuned to working frequency. The two signals SIG1 and SIG2 are ac-coupled through C2 and C3, allowing single supply rail for the comparator 502. These tuned circuits (C4 L4 and C5 L5) provide high AC impedance at working frequency, but provide a low impedance DC path for bias. As mentioned previously, enable pin (EN) 508, which is the signal output by comparator U2 of the magnitude detection circuit 152, determines if the output of zero-crossing detection circuit 162 is disabled or not.

In operation, the zero-crossing detection circuit 162 provides OUT1 at pin 510 to indicate directional changes in the current flowing in receiver coil 124 of FIG. 1, or $L_{COIL}$ in FIG. 2, where OUT1 is disabled unless the current magnitude is greater than a predetermined threshold. The signal OUT1 thereby provides an input to gate driver circuits 192 to synchronize the active rectifier 128 to the AC coil current of the receiver. A second zero-crossing detection circuit can be added, with the inputs swapped (SIG2 and SIG1) to generate the complementary signal.

Figure 6:
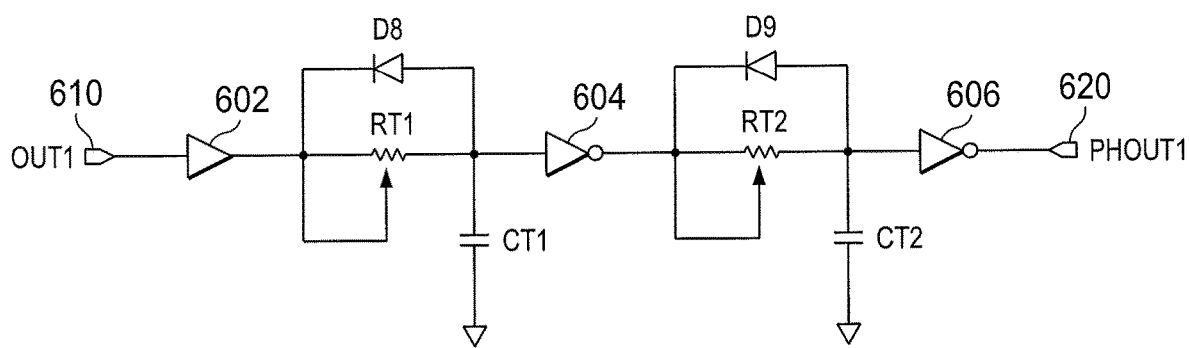
FIG. 6 shows a schematic diagram of the phase shifter circuit of the present invention.

Optionally, the output OUT1 can be connected to a phase shifter to calibrate out the system delay. FIG. 6 shows a schematic diagram of a phase shifter circuit 172 based on an RC circuit and including a buffer 602, diodes (D8, D9), variable resistors (RT1 and RT2), inverters 604 and 606, and capacitors (CT1 and CT2). The delay and duty cycle can be adjusted by changing RT1 and RT2. The input node 610 receives OUT1 from the zero- crossing detection circuit 162 of FIG. 5, and the output PHOUT1 at terminal 620 is provided to gate driver circuits 192.

Figure 7:
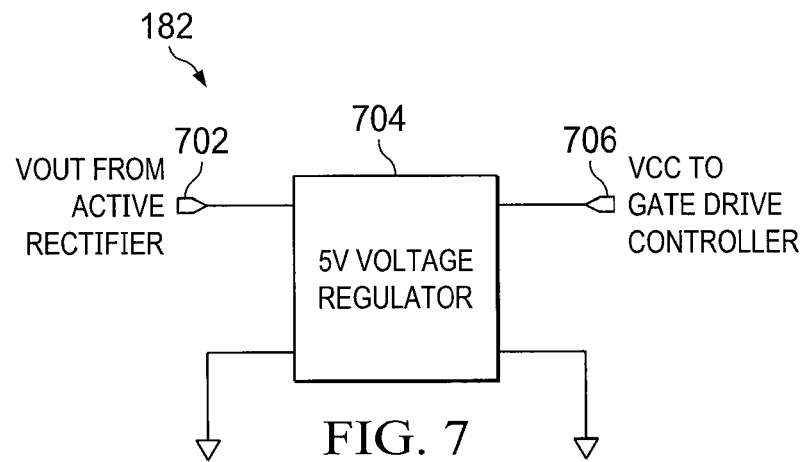
FIG. 7 shows a block diagram of the voltage regulator circuit of the present invention.

FIG. 7 shows a block diagram of a voltage regulator circuit 182 for providing power to the components of the circuit. More specifically, voltage regulator circuit 182 includes a 5V voltage regulator 704 with an input node 702 configured to receive the output voltage (VOUT) of active rectifier 128. The output node 706 of the 5V voltage regulator 704 provides a supply voltage (VCC) that can be used by one or more components of a gate drive controller 132, including, for example, comparator 402 of the magnitude detection circuit 152 in FIG. 4, or comparator 502 of zero-crossing detection circuit 162 in FIG. 5.

Figure 8:
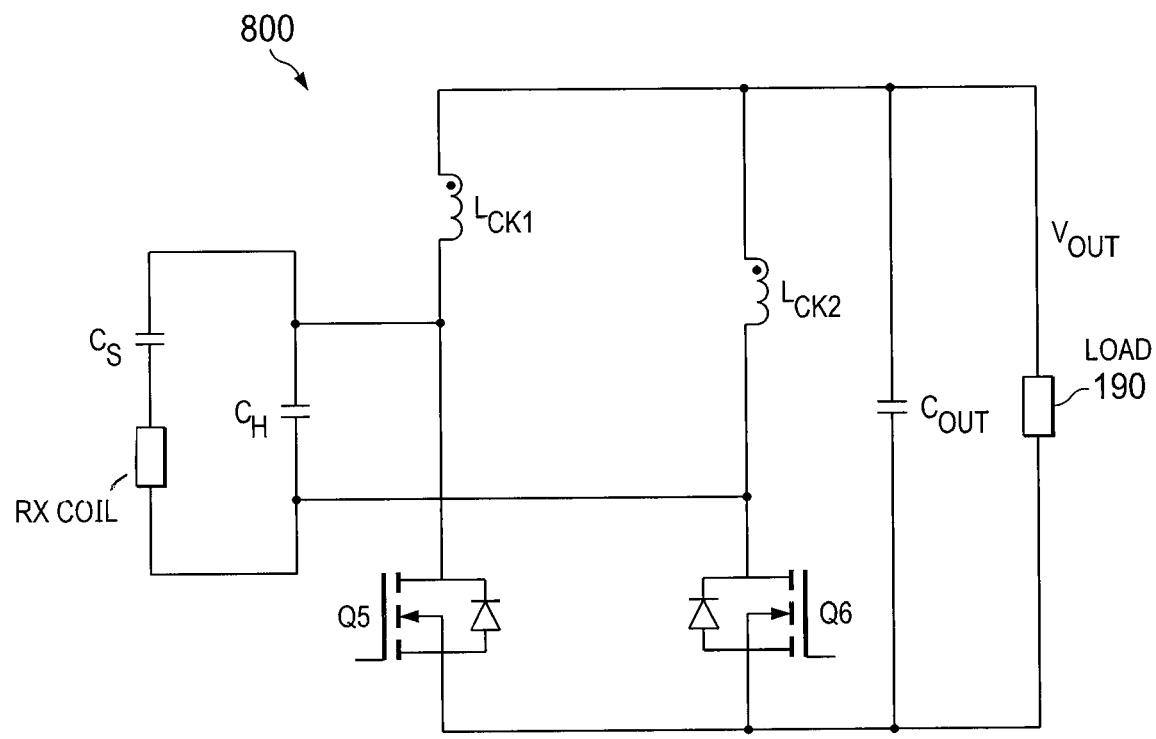
FIG. 8 shows a schematic diagram of a receiver circuit with an active rectifier having a current-mode class-D rectifier topology.

FIG. 8 shows a schematic diagram of an embodiment 800 of the present invention with the active rectifier in a current-mode class-D topology. The electronic device (load 190) may be a wearable, a smart phone, a wireless power hub, or other electronic device. When the receiver coil 802 is placed in proximity to wireless power base station 102, a current is induced in the receiver coil 802. Power transistors Q5 and Q6 rectify the current induced in the receiver coil 802 and provide power to the load 190.

Figure 9:
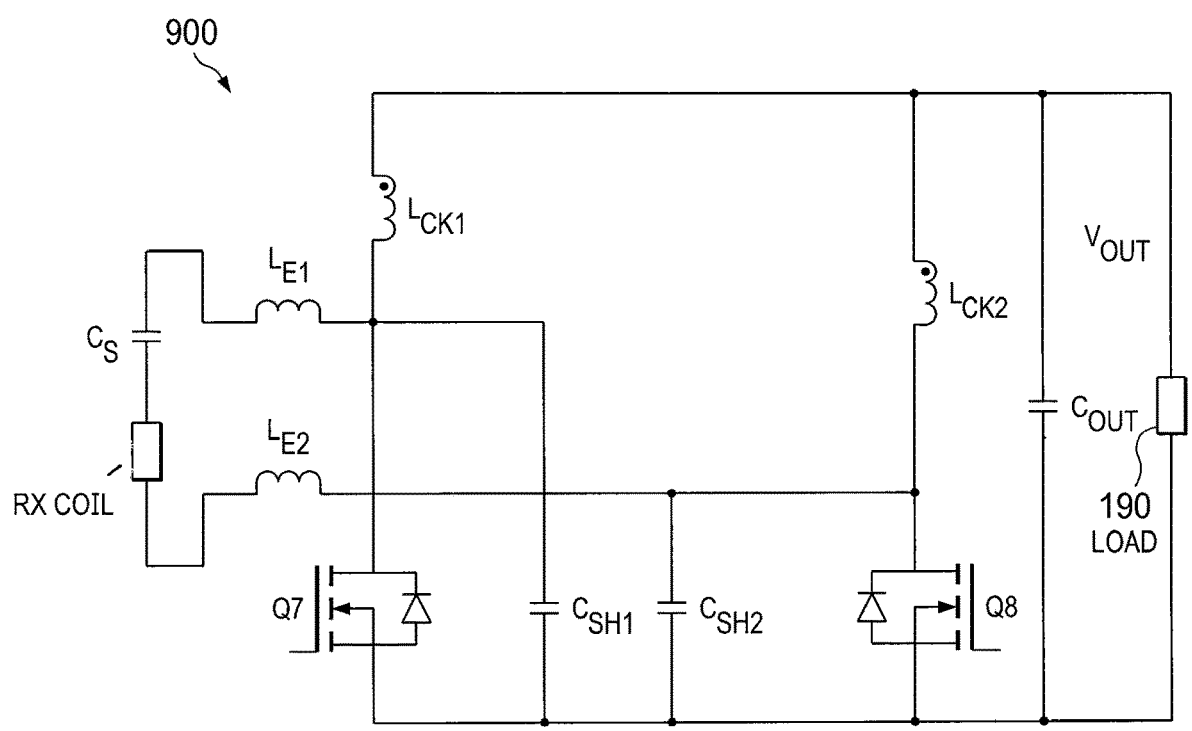
FIG. 9 shows a schematic diagram of a receiver circuit with an active rectifier having differential class-E rectifier topology.

FIG. 9 shows a schematic diagram of an embodiment 900 of the present invention with the active rectifier in a differential class-E topology. The circuit of the present invention may also be used to provide synchronous control of gate signals for active rectifiers in a voltage mode class D topology, a push pull topology, a hybrid topology, and a voltage doubler rectifier topology.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A wireless power receiver circuit, comprising:
an active rectifier circuit including a plurality of power transistors, wherein the active rectifier circuit is configured to rectify an induced AC receiver current;
a gate drive controller circuit configured to sense the induced AC receiver current and to provide gate drive signals to the plurality of power transistors synchronized with the induced AC receiver current,
wherein the gate drive controller circuit comprises a current sense circuit configured to provide two voltage signals having a difference proportional to the induced AC receiver current.

2. The wireless power receiver circuit of claim 1, wherein the plurality of power transistors are GaN transistors.

3. The wireless power receiver circuit of claim 1, further comprising a first winding of a transformer coupled to an input node of the active rectifier circuit, and wherein the current sense circuit comprises a second winding of the transformer, wherein the second winding has more coils than the first winding.

4. The wireless power receiver circuit of claim 3, wherein the gate drive controller circuit comprises a magnitude detection circuit configured to receive the two voltage signals from the current sense circuit and output an enable signal if the induced AC receiver current is greater than a predetermined threshold.

5. The wireless power receiver circuit of claim 4, wherein the gate drive controller circuit comprises a zero-crossing detection circuit configured to receive the two voltage signals from the current sense circuit and generate an output for driving the power transistors when the induced AC receiver current changes direction.

6. The wireless power receiver circuit of claim 5, wherein the output of the zero-crossing detection circuit is enabled by a signal from the magnitude detection circuit if the induced AC receiver current is greater than the predetermined threshold.

7. The wireless power receiver circuit of claim 5, further comprising a phase shifter circuit coupled to an output of the zero-crossing detection circuit to calibrate out system delay.

8. The wireless power receiver circuit of claim 7, further comprising a gate driver integrated circuit coupled between an output of the phase shifter circuit and gate terminals of the power transistors.

9. The wireless power receiver circuit of claim 1, wherein the gate drive controller circuit further comprises a voltage regulator circuit coupled to an output of the active rectifier circuit, and wherein the voltage regulator circuit is configured to power at least some components of the gate drive controller circuit.

10. The wireless power receiver circuit of claim 1, wherein the active rectifier circuit and the the gate drive controller circuit are part of an integrated circuit.

11. The wireless power receiver circuit of claim 10, further comprising a tuning circuit and a receiver coil coupled to the integrated circuit.

* * * * *